July 21, 1970          G. L. HARMON          3,521,172
BINARY PHASE COMPARATOR
Filed Nov. 26, 1965
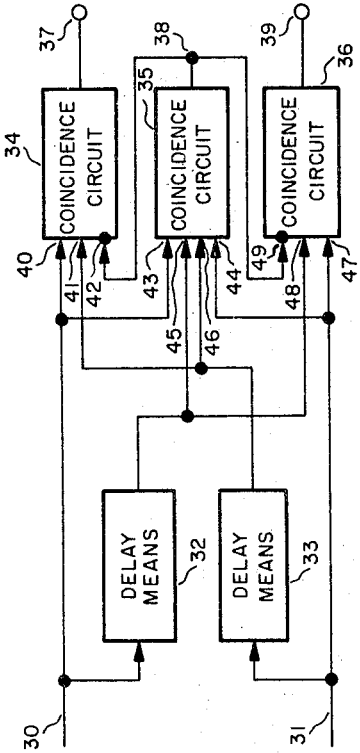
FIG 2
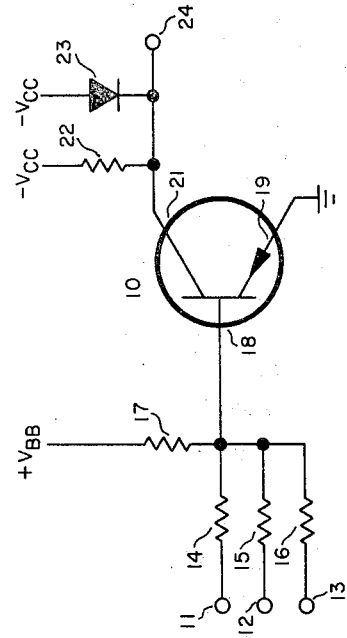
FIG 1
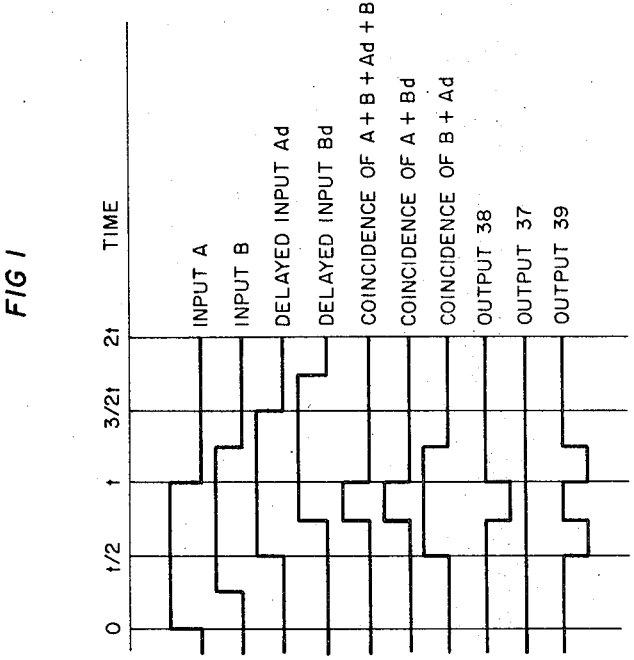
FIG 4
FIG 3
INVENTOR.
GEORGE L. HARMON
BY
Julian C. Renfro
ATTOR.

United States Patent Office 3,521,172
Patented July 21, 1970

---

3,521,172
BINARY PHASE COMPARATOR
George Lamar Harmon, Winter Park, Fla., assignor to Martin-Marietta Corporation, Middle River, Md., a corporation of Maryland
Filed Nov. 26, 1965, Ser. No. 509,993
Int. Cl. H03d *13/00;* G06f *11/00*
U.S. Cl. 328—133                                        11 Claims

ABSTRACT OF THE DISCLOSURE

This invention relates to a digital phase comparator designed to measure phase advance or phase retard between pulse trains on a pulse by pulse basis, the output information from which may be utilized by an analog computer or the like. Delay means are utilized in the comparator not only to make phase measurements, but also to reject errors of omission as well as errors of commission.

---

This invention relates to a circuit for determining the phase relationship between two similar binary pulse trains and more particularly to a circuit for determining the advance or delay of one random binary pulse train relative to a second similar random binary pulse train.

A phase comparator is a circuit which compares the phase of two signals and supplies an indication of which signal leads or lags the other. Phase comparator circuits are frequently used in missile guidance computer units to compare two or more waveforms in order to produce error signals. These error signals are then used in the generation of guidance command signals. For instance, a phase comparator circuit is well suited for use in a terrestrial guidance system in which a signal produced from a photo stored in the system is compared with a scanned signal of the same area. The phase relationship of the signals is then correlated and error signals generated.

Another typical use of phase comparators is as a decoder in communication systems. In intelligence transmission systems it is necessary to develop a synchronizing key or code at the receiving end that will properly match coded transmission. This matching is necessary in order to extract the intelligence being transmitted. In this relationship, phase comparators can compare the phase relationships of known signals with input signals being received from a transmitter.

One group of devices used to determine phase relationships between similar waveforms, such as trains of pulses, utilizes conventional delay lines or other signal delaying means to generate delayed signals from input signals. The input signals and delayed input signals are then fed into a conventional video mixer circuit, the outputs of which consist of the sum and difference modulation products of all the various ways in the which the input pulse trains and delayed input pulse trains can be combined. The phase differences and hence the advance or delay between the two pulse trains under consideration, can be determined from the output modulation products of the video mixer circuit by means of complex filtering techniques.

These systems depend on the modulation products from the video mixer circuit being proportional to the advance or delay of the input pulse trains which are added coherently to produce a larger signal. While these devices are satisfactory for some applications, they require complex techniques to accentuate the signals that represent an advance or delay, and spurious or missing pulses generate output noise errors that cannot be eliminated or discriminated without a multiple complex filtering system. These prior art techniques are also very sensitive to minute voltage and temperature changes.

Other prior art phase comparators are used to detect deviations from a preselected value of time differences between two sets of input pulses of a constant recurrence frequency. These devices generally operate on a balanced bridge principle with no output from the circuit when the input pulse trains are of the desired time difference. The output is negative if the time difference between the pulses is greater than the preselected value and positive if the time difference is smaller than the selected value. The polarity of the output represents the direction of deviation. These prior art devices operate satisfactorily with pulse trains having a constant recurrence frequency and pulses of constant width, but they will not operate with random pulse train inputs, especially where the pulses are of random width. This limitation severely restricts the use of this type of device.

In contrast to the aforementioned devices the present invention will operate with constant or random occurring pulses in a pulse train and with pulses of random widths and is relatively insensitive to voltage and temperature changes. Prior circuits usually generate noise errors as a result of spurious or missing input pulses, while the present invention generates no output in such cases.

This present invention may utilize input lines for receiving pulse train inputs and delay circuits for generating a delayed pulse train from each input pulse train. A first coincidence means is adapted to receive pulses of one polarity from the input lines and delay circuits, and to produce an output pulse of a second polarity. A second coincidence means may receive pulses of one polarity from the input lines and delay circuits, and of a second polarity from the output of the first coincidence means. The second coincidence means produces pulses determinative of the relative advance or delay between input pulse trains.

Other objects, features, and advantages of this invention will be apparent from a study of the written description and the drawings in which:

FIG. 1 shows a schematic diagram of a typical coincidence circuit;

FIG. 2 is a block diagram of a preferred embodiment of the present invention;

FIG. 3 is a diagram of the time relationships of typical pulses in the circuit of FIG. 1;

FIG. 4 is a block diagram of an embodiment of the present invention with optional pulse stretching circuits and control input lines.

A typical coincidence circuit or gate as may be used in the present invention is shown in FIG. 1 which produces a specified output pulse when and only when a specified number or combination of input terminals receive pulses within a specified time interval. The transistor 10 of FIG. 1 comprises a semi-conductive body having an emitter 19, a collector 21 and a base 18. The emitter 19 is connected to ground. The base 18 is connected to a plurality of input terminals 11, 12 and 13 through their respective isolating impedances 14, 15 and 16. The base 18 is also connected through a resistor 17 to a $+V_{BB}$ bias supply. The collector 21 is connected through a current-limiting resistor 22 to a $-V_{CC}$ voltage supply source and through voltage clamping diode 23 to a second $-V_{CC}$ voltage supply. The collector 21 is also connected to an output terminal 24.

In operation, the $+V_{BB}$ supply biases the transistor 10 to cutoff through resistor 17. Thus, when there are no input signals at the terminals 11, 12, and 13, the transistor 10 is cutoff by the very high resistance therein, and the $-V_{CC}$ supply will cause a negative output to appear at terminal 24. If a negative input pulse, sufficient in magnitude to drive the transistor 10 to a fully saturated condition, is applied to the terminals 11, 12, and 13, the transistor 10 will have almost zero resistance and will conduct so that there will be no negative output at the terminal 24.

The diode 23 acts as a limiter and prevents the DC voltage in this part of the circuit from exceeding a set level.

Although the coincidence circuit of FIG. 1 is shown as using a PNP type transistor, an NPN type of transistor may be utilized if the polarities of the various voltages are reversed. Equivalent vacuum tube circuits, relay circuits or other coincidence means including pneumatic or mechanical devices might also be utilized in place of the transistor circuit described.

Referring to FIG. 2 an example of the basic system of the invention is shown in schematic block form. Input lines 30 and 31 preferably convey the incoming binary signals to pulse delay means 32 and 33 which generate pulse signals similar to those of the inputs but delayed by a predetermined time. Delay means 32 and 33 may be any of the well known prior art devices for delaying electrical signals in a circuit such as delay lines or delaying multivibrators. Coincidence circuit 35 is adapted to receive input signals at input terminals 43, 44, 45 and 46 from input lines 30 and 31 and from delay means 32 and 33 respectively. Where the four input signals coincide in time and circuit produces a signal at output terminal 38.

Coincidence circuit 34 may receive input signals at input terminals 40, 41 and 42 from the input line 30, the delay circuit 33 and from the output terminal 38 of coincidence circuit 34, respectively. Signals are produced at output terminal 37 of circuit 34 if the signals at input terminals 40 and 41 coincide without being entirely inhibited by an inhibiting pulse from output terminal 38, which will normally be a signal of opposite polarity from the other inputs into coincidence circuit 34.

Coincidence circuit 36 is adapted to receive signals at input terminals 47, 48 and 49 respectively from input line 31, pulse delay circuit 32 and output line 38 of coincidence gate 35. Signals are produced at output terminal 39 of circuit 36 if the input terminals 47 and 48 receive signals which coincide without being entirely inhibited by an inhibiting pulse from output terminal 38 which is normally of opposite polarity from the other inputs into coincidence circuit 36.

Referring now to FIG. 3, the time relationships of typical pulses at different points in the circuit of FIG. 2 is shown. Input pulse A is received at input 30 of FIG. 2 and leads input pulse B, being received at input 31, by a time $t/4$. Delay circuits 32 and 33 respectively generate delayed pulses $A_d$ and $B_d$ which in this example are delayed by a time $t/4$ from their associated input pulses. If pulses A, B, $A_d$, and $B_d$ coincide at input terminals 43, 44, 45 and 46 of circuit 35 an output pulse will be produced at output terminal 38 which will be of opposite polarity from the input pulses. The output pulse is then used as an inhibiting input pulse in circuits 34 and 36. In this example, the coincidence of input pulse A and delay pulse $B_d$ is shown without the further coincidence with the inhibiting pulse of output 38. The total coincidence of pulses A, $B_d$ and the inhibiting pulse of output 38 in this case produce no signal at output 37. The coincidence of pulses B and $A_d$ produce a wider pulse than pulses A and $B_d$, and upon their coincidence with the inhibiting pulse from output 38 produce two pulses at output terminal 39 which are of opposite polarity from the input pulses. As will be apparent to one skilled in the art the leading pulse of the two output pulses at output terminal 39 will have a pulse length proportional to the time advance between the leading edge of input pulse A and the leading edge of input pulse B. Similarly, the lagging pulse will have a pulse length prooprtional to the time advance between the trailing edge of input pulse A and the trailing edge of input pulse B. It will also be apparent that if the input pulses were approximately equal, with neither pulse leading the other, there would be no output signal produced at either output terminal 37 or 39. Output terminal 38 would, however, produce a pulse.

Referring now to FIG. 4, the block diagram of FIG. 2 is illustrated with pulse stretching means 51 and 52 for increasing the length of short input pulses and with control input lines 53 and 54 for controlling the timing of the pulse stretching means 51 and 52 and pulse delay means 32 and 33 respectively. The circuit preferably has input lines 30 and 31, delay means 32 and 33, coincidence circuits 34, 35 and 36 and output terminals 37 and 39. The pulse stretching means 51 and 52 may be any of the prior art devices for increasing the length of a pulse, such as one shot multivibrators. Pulse stretching means 51 and 52 are preferably connected in series in the input lines 30 and 31. These circuits are needed for very short pulses which have an effective pulse width of zero. In such cases, the coincidence circuits would have difficulty measuring the differences between leading or lagging edges of the input pulses. If one shot multivibrators are used for the pulse stretching means 51 and 52, the timing of the stretching circuits will have to be of a duration short enough to avoid overlapping of the pulses. This is especially true where the short input pulses are separated by relatively short time intervals.

It should be noted that the pulse stretching means might also be located between the delay means 32 and 33 and the coincidence circuits 34, 35, and 36. This would, however, require four such stretching circuits, one for each of the input lines and one following each delay means. If multivibrators are used as the delay means they could also serve a second function as pulse stretchers. In this case two additional pulse stretchers would still be required for the input pulses.

Control input line 53 is shown connected to pulse stretching means 51 and 52, and may be used for controlling the timing therein so that the length of the pulses may be varied by remote control voltages. Similarly, control input 54 is shown connected to pulse delay means 32 and 33, and may be used to control the timing therein so that the duration of the pulse delay may be varied. If the delay means 32 and 33 are also used as pulse stretchers, the control voltages may vary both the duration of delay and the length of the pulses. For instance, by using one shot multivibrators as the pulse stretching means 51 and 52, and for the delay means 32 and 33, control voltage inputs from control input lines 53 and 54 would avoid the necessity of altering or replacing these circuits in the event of a substantial change in the pulse trains.

From the foregoing description it will be clear that a circuit has been provided for determining the relative advance or delay in time between two random binary pulse trains. The circuit as described has a wide range of application some of which have been described. It is to be understood that other variations are contemplated as being within the spirit of the invention. For instance, if one of the coincidence circuits 34 and 36 of FIGS. 2 and 4 were deleted, there would still remain an operative device which would give an indication of which of two signal trains led or lagged the other. Such a device, however, would not always be capable of indicating the amount of relative advance or delay between the signal trains.

This invention is not to be construed as limited to the particular forms disclosed herein, since these are to be regarded as illustrative rather than restrictive.

I claim:

1. A circuit for determining the relative advance or delay in time between similar random binary pulse trains comprising:
   (a) input lines for receiving pulse inputs;
   (b) pulse delay means for generating a delayed pulse from each pulse input;
   (c) first coincidence means for receiving pulses of a first polarity from said input lines and said pulse delay means, and for producing an output pulse of a second polarity; and
   (d) second coincidence means for receiving pulses of a first polarity from said input lines and said delay means and for receiving pulses of a second polarity from the output of said first coincidence means;

(e) said second coincidence means producing pulses of a second polarity, which pulses are determinative of the relative advance or delay between input pulse trains.

2. The circuit according to claim 1 in which said pulse delay means includes an input control means for varying the duration of the delay of each delayed pulse.

3. The circuit according to claim 2 in which said second coincidence means includes two coincidence gate circuits.

4. The circuit according to claim 3 in which said first coincidence means includes one coincidence gate circuit.

5. A circuit for determining the relative advance or delay in time between similar random binary pulse trains comprising:
 (a) input lines for receiving pulse inputs;
 (b) pulse delay means for generating a delayed pulse from each pulse input;
 (c) pulse stretching means for stretching the pulses received in said input lines;
 (d) first coincidence means for receiving pulses of one polarity from said input lines and said pulse delay means, and for producing an output pulse of a second polarity; and
 (e) second coincidence means for receiving pulses of one polarity from said input lines and said delay means and for receiving pulses of a second polarity from the output of said first coincidence means;
 (f) said second coincidence means producing pulses of a second polarity, which pulses are determinative of the relative advance or delay between input pulse trains.

6. The circuit according to claim 5 in which the pulse stretching means includes two pulse stretching circuits, one for each input line.

7. A phase comparator circuit for determining the relative advance or delay in time between two similar random signal trains comprising:
 (a) first and second input lines;
 (b) first delay means connected to said first input line;
 (c) second delay means connected to said second input line;
 (d) first, second and third coincidence circuits, including an output line from each said coincidence circuits;
 (e) said first coincidence circuit connected to receive signals from said first and second input lines, and from said first and second delay means;
 (f) said second coincidence circuit connected to receive signals from said first input line, said second delay means and from the output of said first coincidence circuit;
 (g) said third coincidence circuit connected to receive signals from said second input line, said first delay means and from the output of said first coincidence circuit;

(h) whereby either said second coincidence circuit or said third coincidence circuit will generate signals proportional to the relative advance or delay between two input signal trains.

8. The circuit according to claim 7 including:
 (a) a first stretching means connected to said first input line for lengthening signals being received on said first input line; and
 (b) a second stretching means connected to said second input line for lengthening signals being received on said second input line.

9. The circuit according to claim 8 wherein said first and second delay means have an input control means for varying the duration of delay of each delayed signal.

10. The circuit according to claim 9 wherein said first and second stretching means have an input control means for varying the length that each signal is lengthened.

11. A circuit for determining the relative advance or delay in time between similar random binary pulse trains comprising:
 (a) first and second input lines for receiving first and second pulse inputs;
 (b) first and second pulse delay means connected to receive said first and second pulse inputs, respectively, with each of said pulse delay means having an output;
 (c) one coincidence circuit means connected to receive and compare the outputs of said first input line and said second pulse delay means; and
 (d) another coincidence circuit means connected to receive and compare the outputs of said second input line and said first pulse delay means;
 (e) said one coincidence circuit means including means for providing an output that with regard to polarity and magnitude of shift represents a time advance of one pulse train with respect to the other on a pulse by pulse basis, and
 (f) said other coincidence circuit including means for providing an output that with regard to polarity and magnitude of shift represents a time delay of one pulse train with respect to the other on a pulse by pulse basis;
 (g) said circuit serving to reject errors of commission as well as of omission.

References Cited

UNITED STATES PATENTS

| | | | |
|---|---|---|---|
| 3,187,195 | 6/1965 | Stefanov | 328—133 X |
| 3,200,242 | 8/1965 | Crawford et al. | 235—153 |
| 3,327,226 | 6/1967 | Nourney | 328—110 X |
| 3,328,688 | 6/1967 | Brooks | 328—133 |

JOHN S. HEYMAN, Primary Examiner

U.S. Cl. X.R.

235—153; 307—215; 328—55, 72, 110; 340—146.1, 146.2